United States Patent Office 2,789,855
Patented Apr. 23, 1957

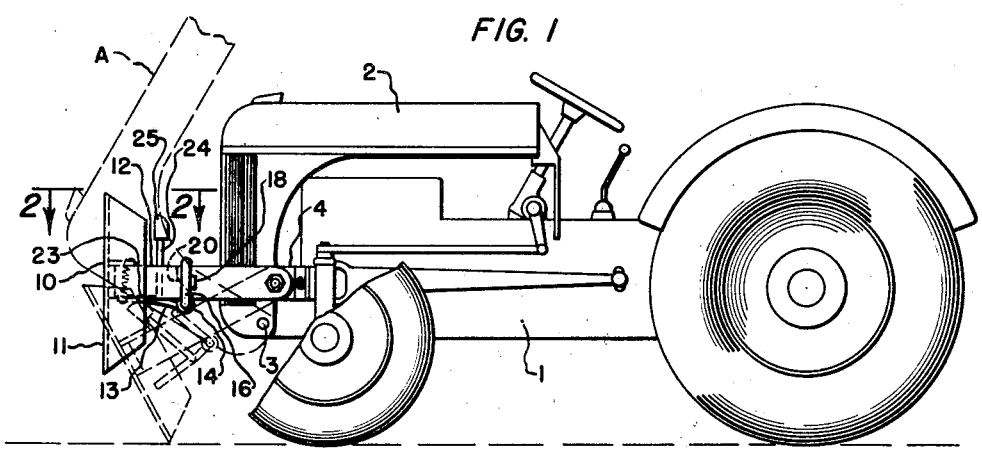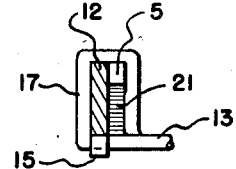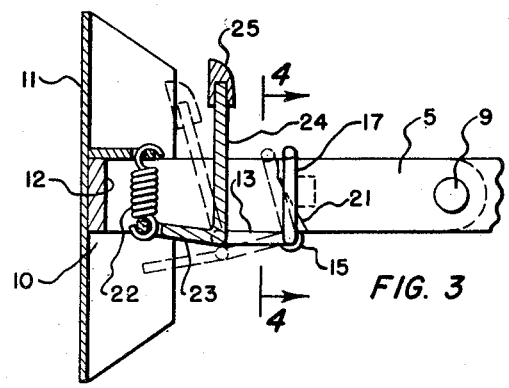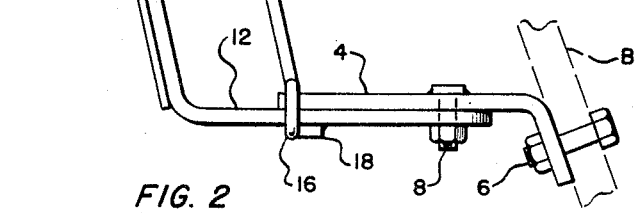

2,789,855

HOOD OPERATED MOVABLE BUMPER FOR TRACTORS

Parker J. Buck, Tacoma, Wash.

Application February 6, 1953, Serial No. 335,455

2 Claims. (Cl. 293—73)

This invention relates to a hood operated movable bumper for tractors and comprises means for automatically moving the tractor bumper downwardly out of the path of the engine hood when it is raised and moved forward to uncover the engine.

Tractors having fixed bumpers and forwardly pivoted hood structures are generally difficult to service because such bumpers prevent sufficient pivoted raising of the hood to permit easy access to the engine. Another difficulty of such an arrangement arises when the hood grill is damaged by forceful contact with the bumper.

It is an object of this invention to provide a bumper releasing mechanism which is automatically tripped by the engine hood, when it is raised whereby the bumper is permitted to drop out of the path of the hood.

Another object of the invention is to provide an automatically movable bumper which cannot cause damage to the hood grill when the hood is raised.

Another object of the invention is to provide an automatically releasing bumper, which moves out of interference with the fully open position of the hood to permit complete and easy access to the engine when desired.

Another object of the invention is to provide a bumper releasing mechanism which is very simple, yet very strong and reliable.

A further object of the invention is to provide a hood operated bumper releasing mechanism which is very simple and economical to produce.

Other objects and advantages will appear from the following specification and claims and when reference is had to the accompanying drawings in which:

Fig. 1 of the drawings is a side elevational view of a tractor having the hood operated movable bumper attached thereto and illustrated by broken lines the varying positions of the hood and bumper.

Fig. 2 is an enlarged plan view taken from the line 2—2 of Fig. 1.

Fig. 3 is a fragmentary sectional view taken from the line 3—3 of Fig. 2, showing by broken lines a varying position of the bumper releasing mechanism; and, Fig. 4 is a sectional view taken from the lines 4—4 of Fig. 3.

Referring to Fig. 1 it will be seen that the tractor 1 is a conventional wheel tractor having an upwardly and forwardly movable hood 2. This hood is pivotally mounted on pins 3 about which it is shiftable into the broken line position A to uncover the engine of the tractor. Fixed to the frontal portions of the tractor axle B are the brackets 4 and 5. These brackets are secured in fixed position by bolts 6 and 7, respectively. Pivotally mounted on the brackets 4 and 5 by means of the bolts 8 and 9, respectively, is the bumper 10. This bumper 10 serves as a working member at the front of the tractor for contacting and/or pushing various objects. The plate member 11 of the bumper 10 is welded or otherwise secured to the bar portion 12 which has substantially the same cross-sectional shape as the brackets 4 and 5. The latch bar 13 is pivoted in bearings 14 and 15 carried by the bar 12 of the bumper. This latch bar is provided with loop portions 16 and 17 adjacent the bearings 14 and 15, respectively. These loop portions 16 and 17 serve as latch elements and surround portions of the bar 12 and the brackets 4 and 5, respectively, as shown best in Figs. 2 and 4 of the drawings. The stops 18 and 19 on the bar 12 are engageable by the loop portions 16 and 17 of the latch bar 13 when in latched position. The brackets 4 and 5 at their forward ends, adjacent the loop portions 16 and 17, are provided with bevel portions 20 and 21, respectively, which serve as cam surfaces for the loop portions 16 and 17 when returning to latched position as will be hereinafter described. The spring 22 is connected to the bumper 10 at its one end and is secured at its opposite end to the lever 23 of the latch bar 13, and tends to hold the loop portions 16 and 17 in latched position against the stops 18 and 19. Fixed to the latch bar 13 in the path of the hood grill 2 is the hood engaging lever member 24. This lever is provided with a protecting shoe 25 which prevents damage to the tractor hood grill when engaged thereby.

When it is desired to raise the engine hood 2, it is manually pivoted forward on the pins 3 into substantially the broken line position A. During such pivotal movement, the hood grill engages the shoe 25 on the lever 24. This causes pivotal movement of the levers 23 and 24 fixed to the latch bar 13 which also carries the loops 16 and 17 into the broken line position as shown in Fig. 3. In this broken line position the latch loops 16 and 17 are disengaged from the top edges of the brackets 4 and 5 permitting the bumper 10 to pivot downwardly on the bolts 8 and 9 out of the path of the hood 2 at its forward stop position shown by broken lines A. When the hood 2 has been pivotally replaced to the solid line position of Fig. 1, the bumper 10 may be manually raised into working position. During raising movement of the bumper 10, the loops 16 and 17 pass over the beveled portions 20 and 21 of the brackets 4 and 5, and tension of the spring 22 causes the loops 16 and 17 to engage the upper edges of the brackets 4 and 5 and to move into stop position against the stops 18 and 19.

This invention has been disclosed as related particularly to a hood operated movable bumper for tractors, however, other uses may be made thereof, and structural changes made therein without departing from the spirit of the invention as set forth in the appended claims.

I claim:

1. A tractor having a hood pivoted at its forward portion to said tractor, brackets fixed to the forward portion of said tractor, a working member, pivotally mounted on said brackets, and latch means for holding said working member in certain position relative to said brackets, said hood when pivoted forwardly engageable with said latch means for releasing said working member and permitting it to pivot downwardly relative to said brackets, said latch means pivotally mounted on said working member, and including a bar having means on each end engageable with one of said brackets, said latch means also including a lever fixed to said bar and disposed in the path of said hood and engageable thereby and means for returning said latch means to latching position after it has been released.

2. A tractor having a hood pivoted at its forward portion to said tractor, brackets fixed to the forward portion of said tractor, a working member, pivotally mounted on said brackets, and latch means for holding said working member in certain position relative to said brackets, said hood when pivoted forwardly engageable with said latch means for releasing said working member and permitting it to pivot downwardly relative to said brackets, said latch means including a bar pivotally mounted on said working member, and having end portions engaging the upper edges of said brackets near the forward ends thereof, and forwardly of the pivoted connections of said working member with said brackets, a lever on said bar in the path of said hood, and a spring tending to maintain said end portions of said bar engaged with said brackets, said hood engageable with said lever for pivoting said bar and shifting its end portions beyond the ends of said brackets for releasing said working member and permitting it to pivot downwardly.

References Cited in the file of this patent

UNITED STATES PATENTS

| | | |
|---|---|---|
| 2,189,169 | Cox | Feb. 6, 1940 |
| 2,699,615 | Malvese | Jan. 18, 1955 |

FOREIGN PATENTS

| | | |
|---|---|---|
| 185,803 | Germany | July 29, 1906 |
| 569,087 | Great Britain | May 3, 1945 |
| 102,263 | Sweden | Aug. 12, 1941 |